US00RE36131E

United States Patent [19]

Schramm

[11] E Patent Number: Re. 36,131

[45] Reissued Date of Patent: Mar. 9, 1999

[54] SPILL-RESISTANT BUBBLE SOLUTION CONTAINER

[76] Inventor: Michael R. Schramm, 120 Glacier Ave. South, Pacific, Wash. 98047

[21] Appl. No.: 531,768

[22] Filed: Sep. 21, 1995

Related U.S. Patent Documents

Reissue of:

[64] Patent No.: 5,246,046
Issued: Sep. 21, 1993
Appl. No.: 828,345
Filed: Jan. 30, 1992

[51] Int. Cl.[6] ..... B65B 1/04; B65B 3/04

[52] U.S. Cl. ..... 141/98; 141/311 A; 141/333; 141/339; 446/20; 220/719

[58] Field of Search ..... 141/331, 339, 141/340, 364, 98, 94, 95, 311 A, 333; 446/15, 16, 17, 19, 20, 74; 220/731, 734, 719; 222/109, 570, 571, 567, 569; 4/283, 259; D21/59

[56] References Cited

U.S. PATENT DOCUMENTS

| | | | |
|---|---|---|---|
| 676,924 | 6/1901 | Steiger, Jr. | 4/283 |
| 1,210,397 | 1/1917 | Bang | 4/283 |
| 2,810,491 | 10/1957 | Goldschmidt | 220/719 |
| 2,858,639 | 11/1958 | Lawrence . | |
| 3,579,898 | 5/1971 | Hein | 46/7 |
| 3,818,627 | 6/1974 | Lebensfeld | 446/15 |
| 4,840,597 | 6/1989 | Perez | 446/16 |
| 4,981,239 | 1/1991 | Cappel et al. | 222/109 |
| 4,984,714 | 1/1991 | Sledge | 222/109 |
| 5,022,559 | 6/1991 | Condon | 222/109 |
| 5,088,950 | 2/1992 | LaFata | 446/19 |
| 5,105,975 | 4/1992 | Patterson | 220/709 |
| 5,169,026 | 12/1992 | Patterson | 220/719 |
| 5,304,085 | 4/1994 | Novak | 446/15 |

OTHER PUBLICATIONS

Little Kids, product packaging for No–spill bubble mug and tumbler, 2 pages, 1995.

TOI, product packaging for bubble brush, 1 page, no date.

TOI, Product package for snap–on bubble container, 1 page, 1993.

Remco, product package for bubble glider, 1 page, 1992.

SpectraStar, product package for bubble kite, 1 page, 1992.

Avon, package for fingernail polish container, 1 page, no date.

One Step Ahead, spill proof paint cups, p. 46, no date.

*Primary Examiner*—Henry J. Recla
*Assistant Examiner*—Steven O. Douglas

[57] ABSTRACT

The spill resistant bubble solution container is an invention that because of its unique geometry and design, prevents spillage of liquid when filled to the fill line or below, and oriented in any position. It is principally intended for use by young children in avoiding the spillage of bubble solution.

14 Claims, 6 Drawing Sheets

SPILL-RESISTANT BUBBLE SOLUTION CONTAINER

Matter enclosed in heavy brackets [ ] appears in the original patent but forms no part of this reissue specification; matter printed in italics indicates the additions made by reissue.

SUMMARY

The spill resistant bubble solution container is designed to eliminate or virtually eliminate the spillage of bubble solution with no increased difficulty in accessing the solution. The invention is principally intended to solve the problem of spilled bubble solution (both within and without the home) by young children who typically use the traditional (wide mouth) open cylindrical bubble solution container. The traditional cylindrical container, if not held in a vertical or upright position, will allow the spillage of its contents proportionate with the original content level. If the traditional container is tipped over or dropped, the entire content is rapidly spilled.

DESCRIPTION OF INVENTION

The invention is a bubble solution container that when filled to the fill line or below, will resist spillage when oriented in any position, yet will allow easy access to the solution. This result is obtained by the unique geometry of the container which has a trapped funnel that extends approximately half way into the bottle. This allows a bubble wand to be inserted through the funnel and dipped into the bubble solution yet the container will resist spillage of the solution when oriented in any position.

It is intended that all of the parts except the bottle are to be made by injection molding using a thermoplastic resin compatible with the injection molding process. It is intended that the bottle will be made by blow molding using a thermoplastic resin compatible with the blow molding process. It is intended that the spill resistant container will be primarily used by children to avoid spilling bubble solution without restricting their access to the solution to blow bubbles.

BRIEF DESCRIPTION OF DRAWINGS

The objects and many attendant advantages of this invention will be readily appreciated and become readily apparent as the same becomes better understood by reference to the following detailed description, when considered in conjunction with the accompanying drawings and in which like reference numerals designate like parts throughout the figures thereof and wherein.

DETAILED DESCRIPTION

Figure 1:
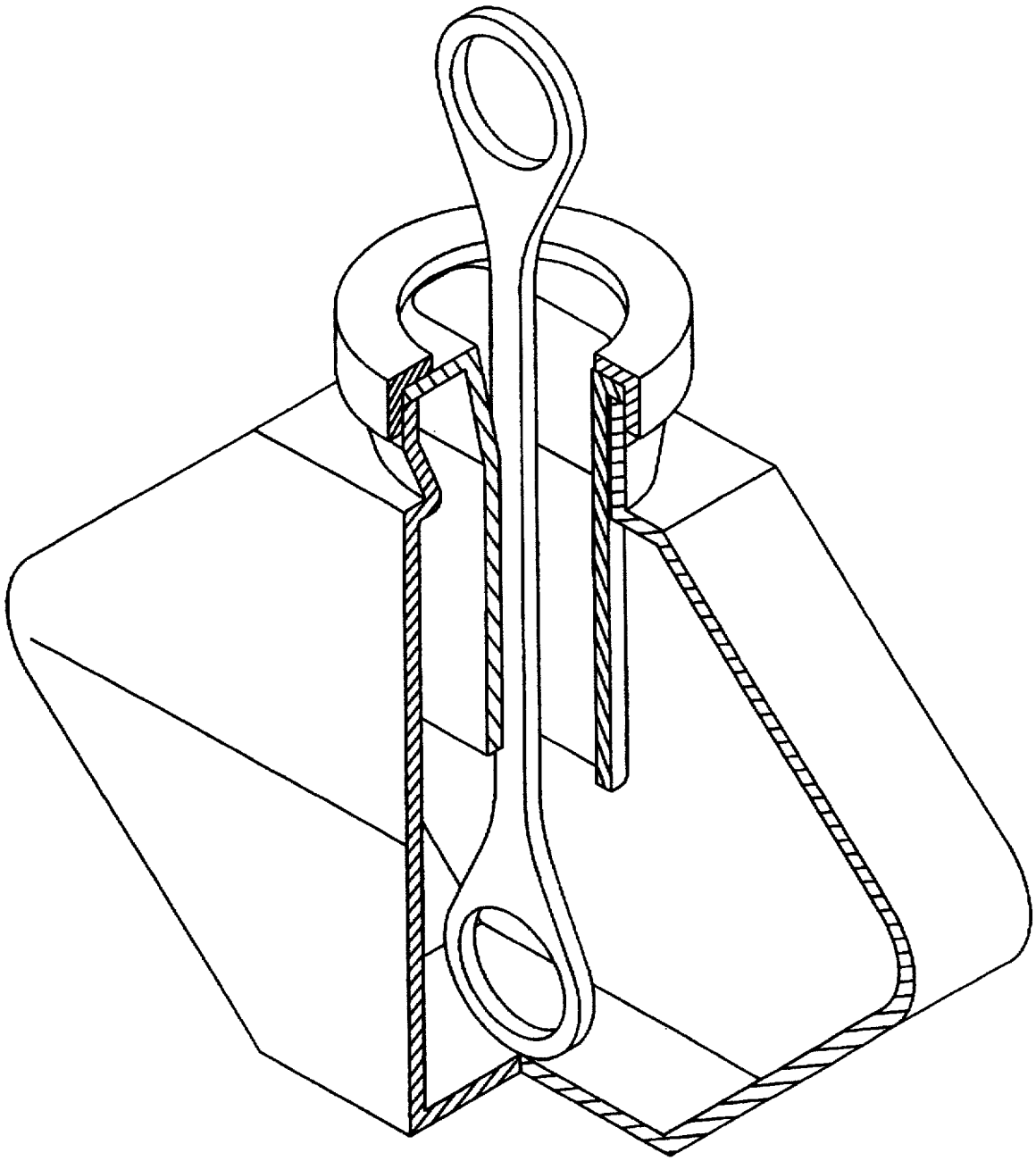
FIG. 1 is a cutaway assembly view of the bubble solution container.

Referring now to FIG. 1, the invention is a container for bubble solution or other liquid that, because of its unique geometry and design, when filled to the maximum fill line 12 or below, resists spillage of the liquid. This benefit is obtained whether the container is accidentally knocked over or dropped, or if intentionally rotated or oriented in any position.

Figure 3:
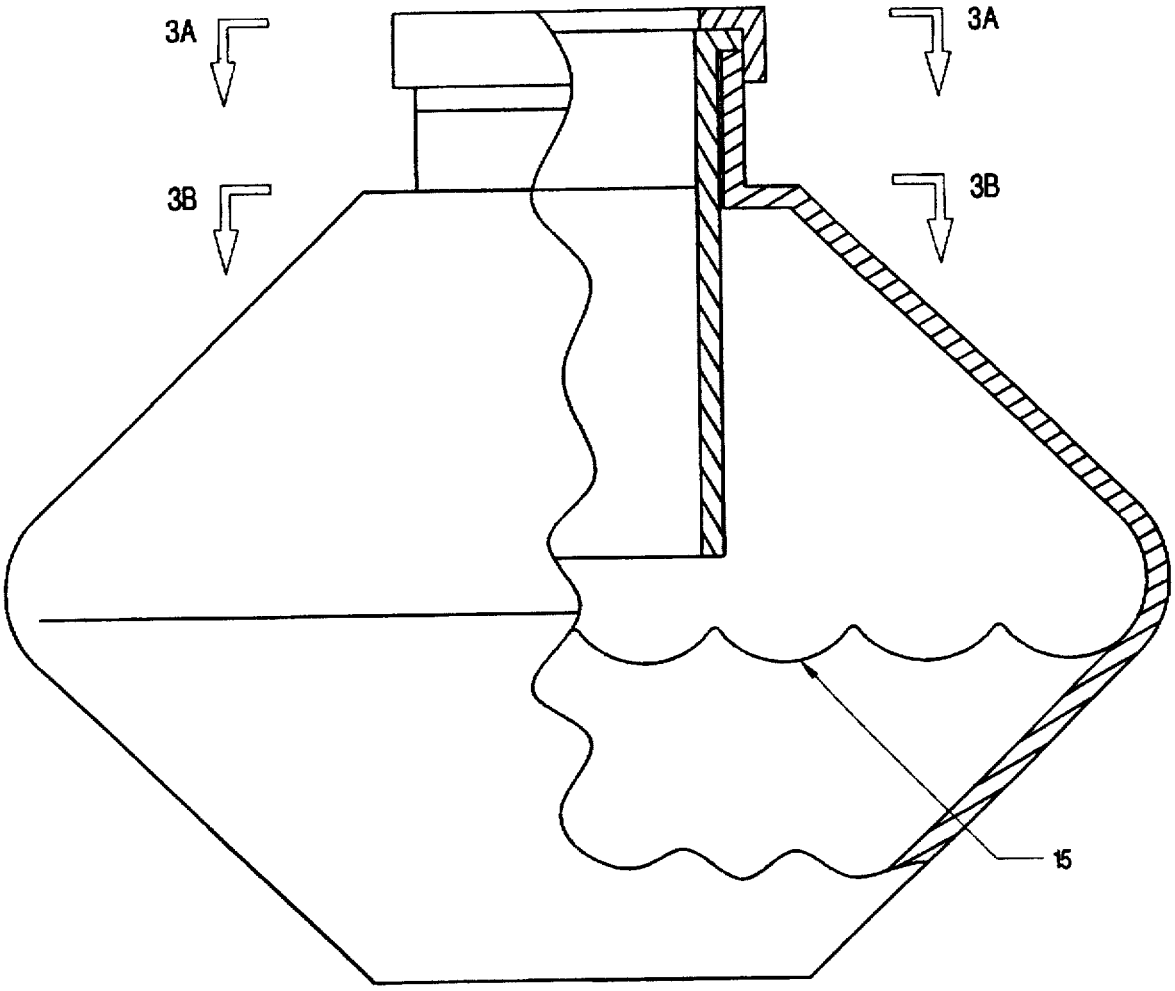
FIG. 3 is a view of the bottle and funnel in the upright or vertical position with bubble solution in the bottom of the bottle, and shows where section cuts 3A and 3B are made.

This unique advantage is illustrated by the following description of various bottle orientations as shown in the figures: when the container is in the upright position as shown in FIG. 3, the liquid will always be below the lower edge of the funnel 13.

Figure 6:
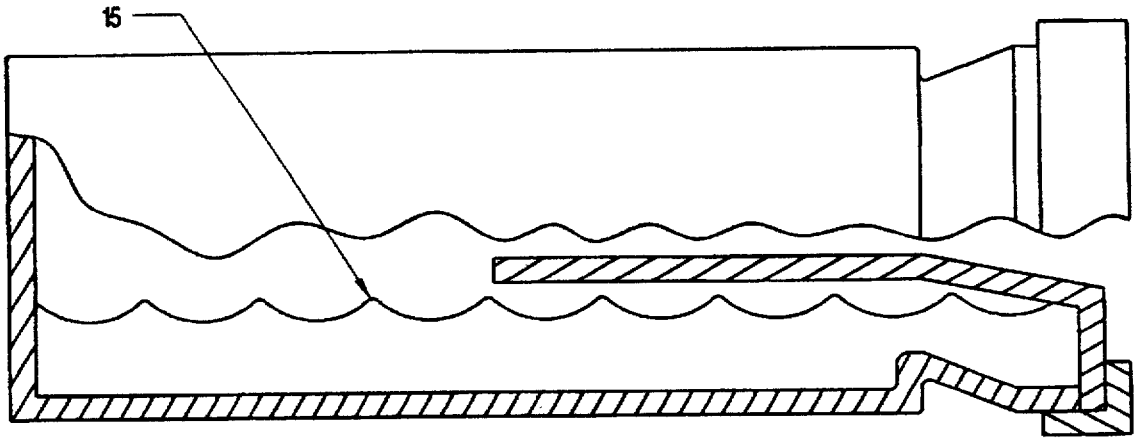
FIG. 6 is a view of the bottle and funnel in a sideways position with the bubble solution in the current lower side of the bottle.
Figure 4:
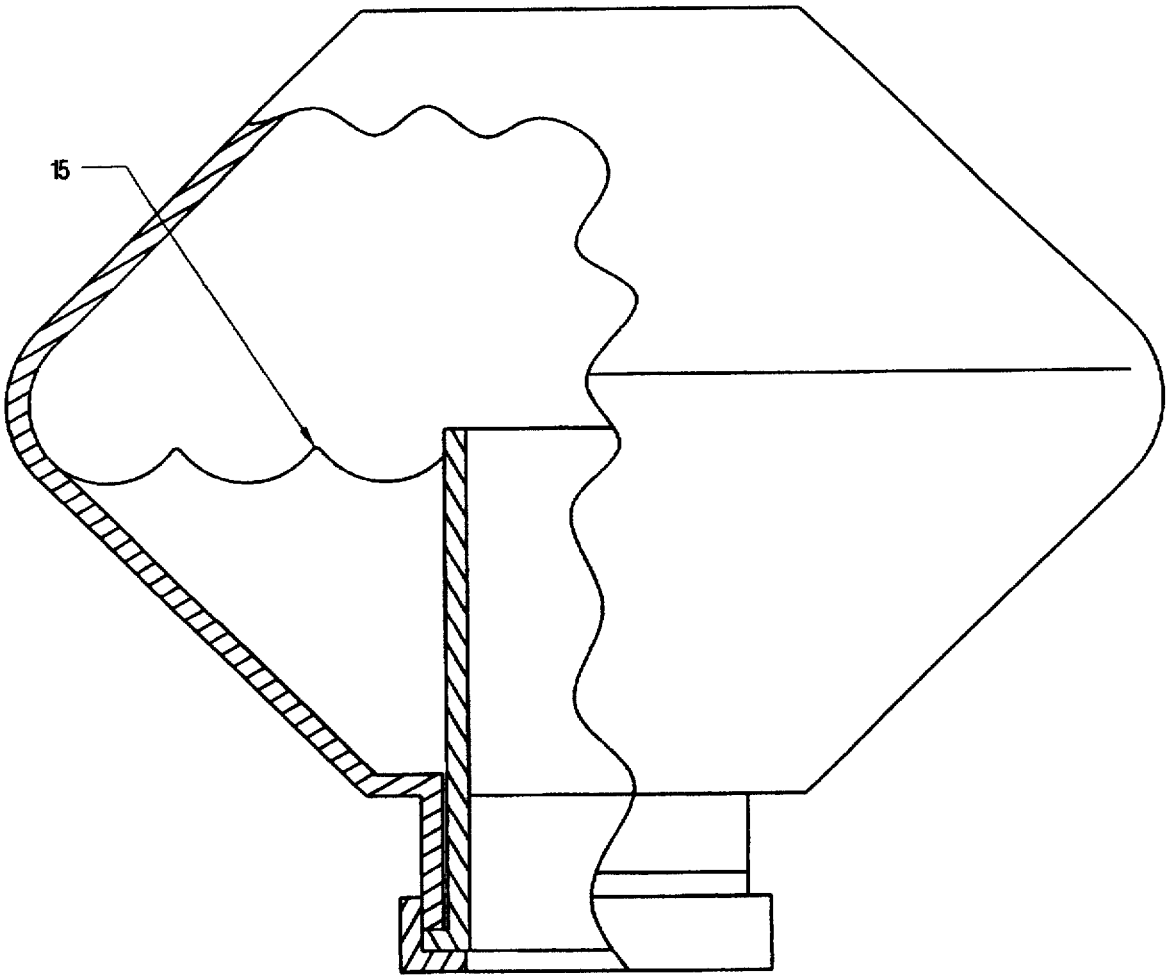
FIG. 4 is a view of the bottle and funnel in the upside down position. The bubble solution is shown retained in the top of the bottle.
Figure 5:
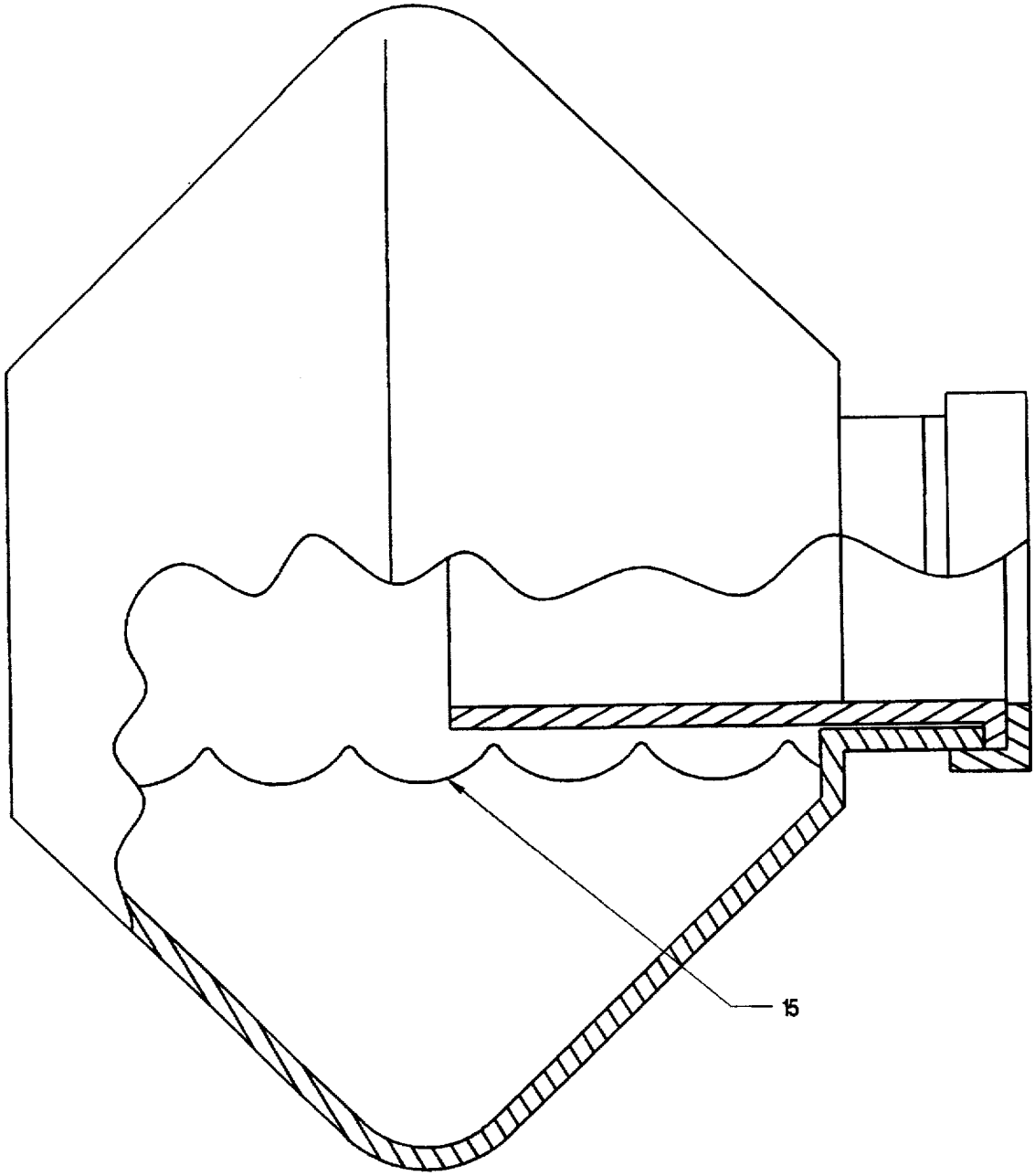
FIG. 5 is a view of the bottle and funnel in a sideways position with the bubble solution in the current lower side of the bottle.

When the container is in the upside down position as in FIG. 4, the liquid will occupy the space immediately around the funnel 8. The liquid level will always be between the bottom and the top of the funnel, thus preventing the liquid from running out. When the container is in a sideways position as in FIG. 5 and 6, the liquid level will always be between the lower funnel side and the lower side of the bottle. Furthermore, when the container is oriented in any of an infinite variations of the above described positions, it will behave in a like manner and prevent the spillage of the solution.

Figure 2:
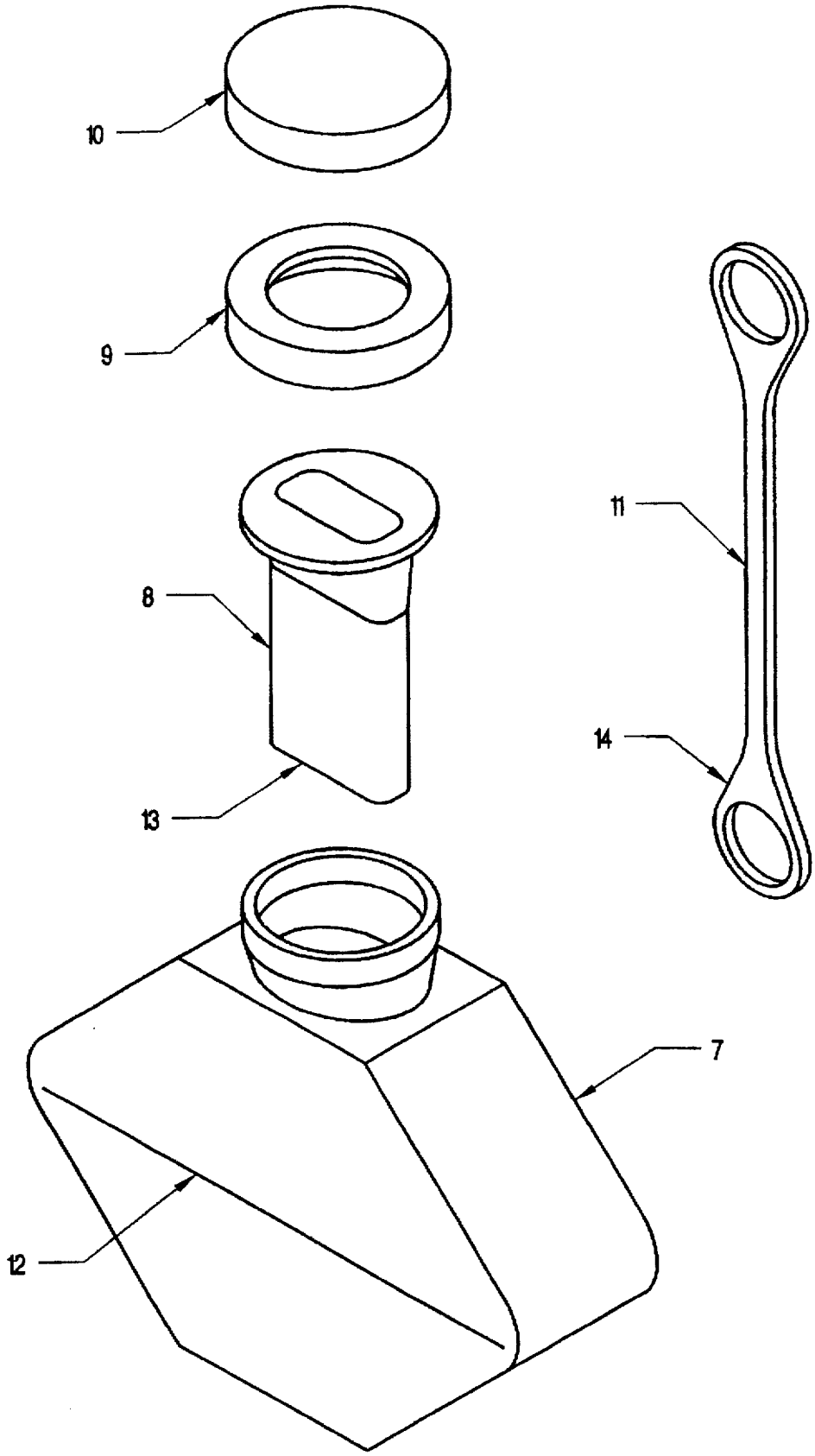
FIG. 2 is an exploded view of the various parts that make up the bubble solution container and it illustrates their relationship to each other.

The following design features are used in performing the above described spill resistant function and are apparent by reference to FIG. 2. Furthermore, number 12 represents the maximum fill line, number 7 represents the bottle, number 13 represents the lower edge of the funnel, number 8 represents the funnel, number 9 represents the (threaded) retaining ring, number 10 represent the (threaded) cap (for storage), number 11 represents the customized wand with tapers, and number 14 represents the tapered portion of the wand. Additionally, number 15 represents the fluid level, number 16 represents the narrow cross-section of the funnel, number 17 represents the elliptical cross-section of the bottle neck, number 18 represents the wide cross-section of the funnel, and number 19 represents the circular cross-section of the bottle neck.

Figure 3A:
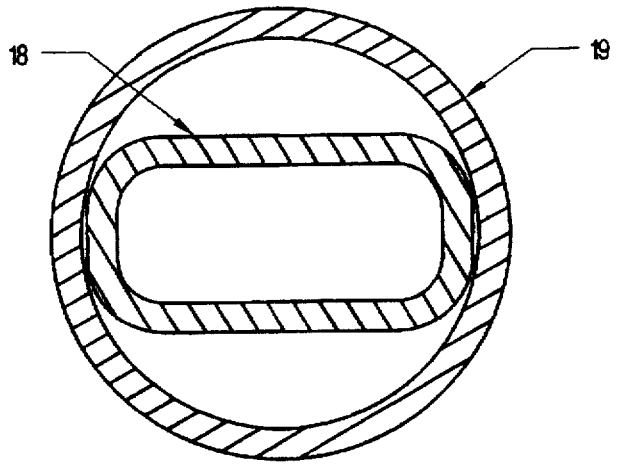
FIG. 3A is a view representing a section cut made at the top or circular area of the bottle and funnel.
Figure 3B:
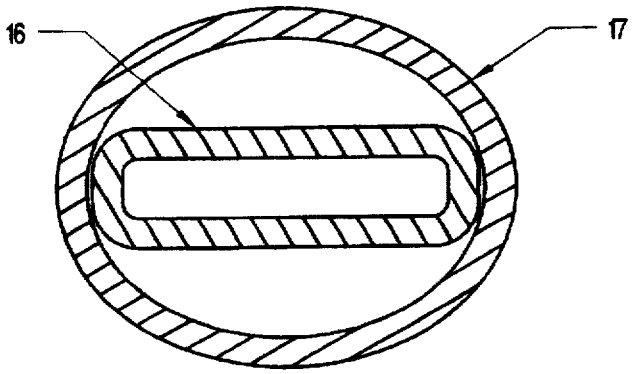
FIG. 3B is a view representing a section cut made at the lower or elliptical area of the bottle and funnel.

The "maximum" fill line 12 is placed no higher on the bottle than to allow the maximum amount of liquid that will be below the funnel 8 in any orientation, as described in the above paragraph. Referring now to FIGS. 3A and 3B, the mouth 19 and neck 17 of the bottle transitions from a circular to an elliptical cross-section. This causes the funnel 8, when inserted into the bottle 7, to be self-aligned to, and captivated in the correct position. When the lower edge 13 of the funnel 8 is in the circular area or mouth 19 of the bottle neck it can rotate freely about the funnel's vertical center line. When the lower edge of the funnel is in the elliptical cross-sectional area 17 its movement is restricted as the width of the funnel is slightly smaller than the inside major diameter of the neck yet it is larger than the minor diameter of the neck. If, after being fully inserted in the bottle, the funnel were either misaligned or free to rotate, then the container would not resist spillage of liquid in all positions. Additionally, while not mandatory for the spill resistant function, the wand 11 shown in FIG. 2 is designed with tapers on both ends to facilitate easy withdrawal of the wand from the container assembly. As seen in FIGS. 1 and 2, the wand's shape eliminates partial entrapment of the wand by the lower edge of the funnel.

As shown in FIG. 2, the threaded retaining ring 9 keeps the funnel in place. The optional threaded cap 10 can be used in place of the retaining ring, for storage, to eliminate evaporation of the liquid and to prevent foreign matter from entering the container.

DESCRIPTION OF THE PREFERRED EMBODIMENT

The preferred size and shape of the container is shown in FIG. 1. The approximate size of the bottle is 2.0 inches×5.0 inches. The fill line 12 is located approximately 2.0 inches up from the bottom of the bottle. This allows for a solution capacity of approximately 15.0 cubic inches (approximately 8.0 ounces), which is a common size of the conventional bubble solution refill container.

While the shape of the bottle could vary within the functionality requirements previously described, it was designed with tapered sides for efficient consumption of solution. If the sides were straight, a smaller percentage of solution would be used (before the liquid level would be below the top of the circular opening in the wand) per bottle filling.

While the function of a spill resistant container may be achieved by the use of a spring loaded trap door or a movable float or other devices, or the function of locating the funnel may be achieved by means of a tongue and groove, doing so would not depart from the overall spirit of the invention. Furthermore, it is believed that the invention is in its preferred design as all the parts are designed for cost efficient, high volume plastic molding processes, and there are no moving parts required for the spill resistant function.

It is noted that the invention was specifically designed for bubble solution, but it would function with other liquids as well. Also, the preferred material for all of the parts is any of the plastics commonly used in injection molding and blow molding, such as polyethylene, polypropolene, polyester, nylon, etc.

I claim:

1. An improved container for liquid comprising a container having a top, a base and sidewalls enclosing an inner cavity and wherein the container has height, width and depth dimensions such that the width is substantially larger than the depth, a mouth having an upper end and a lower end extending from the top of said container, said lower end having an elliptical cross-section adjacent the exterior of said container with a major axis extending through the width thereof parallel to the longitudinal axis of the width of said container, said container further comprising a neck portion integrally connecting said lower end of the mouth to the inner cavity of said container, and a funnel having an upper end connected to said mouth and depending downward from said mouth, through said neck portion and terminating in a lower end in the cavity of said container, said funnel having a hollow opening to provide communication between the exterior of said container and said inner cavity of said container, said funnel having dimensions such that the width thereof is substantially equal to the width of said lower end of said mouth and the distance between the base of the container and the lower end of the funnel is greater than a liquid level of a predetermined volume of liquid in said container when resting on its base and the distance between any sidewall and the funnel is greater than the liquid level of said predetermined volume of liquid in said container when resting on any of its sidewalls, said container thereby providing resistance to spillage of the liquid contents of said container when oriented in any position.

2. The container of claim 1 wherein said mouth is of a circular cross-section at the uppermost end thereof adjacent the exterior of said container and wherein said mouth cross-section tapers from its circular cross-section at the uppermost end of said mouth to the elliptical cross-section at the lower end of said mouth, and wherein said neck portion which is integrally connected to the lower end of said mouth is of an elliptical cross-section.

3. The container of claim 2 wherein said tapered portion provides a supporting lip to receive said funnel.

4. The container of claim 3 wherein said funnel has an upper portion and a lower portion, said upper portion forming a circular end cap, and said lower portion having a rectangular cross-section wherein said lower portion depends downward from said circular end cap, wherein said funnel is removaly positioned in the mouth and neck portion of said container, said circular end cap resting on said supporting lip, and wherein said lower portion of said funnel depends downward into said cavity of said container.

5. The funnel of claim 4 wherein said rectangular cross-section of said lower portion of said funnel has a width greater than the minor diameter of said elliptical cross-section such that the rotational movement of said funnel when positioned through said mouth and neck portion is thereby impeded.

6. The container of claim 5 having a fill line positioned on the exterior of said container at a position lower than the lower most end of said downward depending funnel within the cavity of said container, wherein said fill line indicates the maximum level of liquid to be contained within said container.

7. The container of claim 6 wherein said funnel is of sufficient length to extend downward into said cavity of said container, but not into the liquid within said container which is at or below said fill line.

8. The funnel of claim 1 where a wand is removably positioned within said opening of said funnel in such a manner as to access said liquid within the cavity of said container.

9. The funnel of claim 8 wherein said wand has tapers on both ends thereof, thereby permitting easy insertion into and out of said funnel.

*10. A container defining an inner cavity, and a funnel extending into the inner cavity of said container to provide communication between said inner cavity and the exterior of said container to inhibit spillage of the contents of said container, at least a portion of the length of said funnel being substantially rectangular in cross-sectional shape and wherein said funnel is unencumbered by a reciprocating piston within said funnel and wherein said container prevents spillage of a predetermined amount of liquid contents of said container when said container is oriented in any position, and wherein said predetermined amount of liquid is equal to a volume of liquid of no greater than half the volume of said container and said length of said funnel is greater than 25% of the height of said container.*

*11. A container having a top surface, a bottom surface, and side surfaces defining an inner cavity, and a non annular funnel extending into the inner cavity of said container, said non annular funnel having an inner opening in said inner cavity and an outer opening exterior to said inner cavity, said inner opening being located substantially equidistant between said top surface of said container and said bottom surface of said container and said inner opening being located substantially equidistant between said side surfaces of said container to provide communication between said inner cavity and the exterior of said container*

*to inhibit spillage of the contents of said container and wherein said container prevents spillage of a predetermined amount of liquid contents of said container when said container is oriented in any position, and wherein said predetermined amount of liquid is equal to a volume of liquid of no greater than half the volume of said container.*

*12. A container for liquid defining an inner cavity, and a cover removably and reattachably connected to said container, said cover having a substantially rectangular shaped opening to provide communication between said inner cavity and the exterior of said container, and a bubble creation device removably positioned within said container, said bubble creation device being discretely separable from said container, and wherein said container inhibits spillage of a predetermined amount of liquid contents of said container when said bubble creation device is withdrawn from said container through said rectangular shaped opening and said container is oriented in any position, and wherein said predetermined amount of liquid is equal to a volume of liquid of no greater than half the volume of said container.*

*13. A container having a top surface, a bottom surface, and side surfaces defining an inner cavity, and a funnel extending into the inner cavity of said container, said funnel having an inner opening and an outer opening, said inner opening being located substantially equidistant between said container side surfaces, said top surface, and said bottom surface to provide communication between said inner cavity and the exterior of said container, and wherein said funnel is unencumbered by a reciprocating piston within said funnel, said container having a non singular bubble orifice/non hollow brush liquid access device removably positioned within said container and wherein said container prevents spillage of a predetermined amount of liquid contents of said container when said container is oriented in any position, and wherein said predetermined amount of liquid is equal to a volume of liquid of no greater than half the volume of said container.*

*14. A container for liquid defining an inner cavity, at least one opening in said container comprising an open rectangular slot, and at least one bubble creation device removably positioned within said at least one opening, said bubble creation device being discretely separable from said container, and wherein said container inhibits spillage of a predetermined amount of liquid contents of said container when said bubble creation device is withdrawn from said container through said rectangular opening and said container is oriented in any position, and wherein said predetermined amount of liquid is equal to a volume of liquid of no greater than half the volume of said container.*

* * * * *